United States Patent
Gebhart et al.

(10) Patent No.: US 7,769,864 B2
(45) Date of Patent: Aug. 3, 2010

(54) ADAPTATION OF CLUSTERS TO VIRTUALIZATION TECHNOLOGIES

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 250 days.

(21) Appl. No.: 11/833,200

(22) Filed: Aug. 2, 2007

(65) Prior Publication Data
US 2009/0037572 A1   Feb. 5, 2009

(51) Int. Cl.
*G06F 15/173* (2006.01)
*G06F 9/46* (2006.01)

(52) U.S. Cl. ....................... 709/226; 718/105
(58) Field of Classification Search ......... 709/223–226; 718/100–108
See application file for complete search history.

(56) References Cited

U.S. PATENT DOCUMENTS

| | | | |
|---|---|---|---|
| 7,558,287 B2 | 7/2009 | Malik et al. | |
| 7,607,005 B1 | 10/2009 | Lewis | |
| 2005/0091365 A1 | 4/2005 | Lowell et al. | |
| 2007/0074208 A1 | 3/2007 | Ling et al. | |
| 2007/0189324 A1 | 8/2007 | Rose et al. | |

*Primary Examiner*—Joseph E Avellino
*Assistant Examiner*—Afshawn Towfighi
(74) *Attorney, Agent, or Firm*—Mintz, Levin, Cohn, Ferris, Glovsky & Popeo, P.C.

(57) ABSTRACT

Methods and apparatus, including computer program products, are provided for adapting processing in a distributed computing system based on automatically detected changes caused by virtualization. In one aspect, the computer-implemented method includes detecting whether one or more changes occur at a cluster of a distributed computing system. The one or more changes may be caused by a virtualization system. Moreover, the one or more changes may correspond to at least one of a quantity of processors at the cluster, a quantity of memory at the cluster, a quantity of bandwidth among nodes of the cluster, and a storage speed. The cluster may be adapted based on the detected changes. Related apparatus, systems, methods, and articles are also described.

20 Claims, 3 Drawing Sheets

ADAPTATION OF CLUSTERS TO VIRTUALIZATION TECHNOLOGIES

FIELD

The present disclosure generally relates to distributed computing. More particularly, the present disclosure relates to adapting processing in a distributed computing system.

BACKGROUND

Computers have now become an integral part of our society both in business and in residential settings. Almost every business of sufficient size in Germany, the United States, and other developed countries have one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of nodes that work together to perform a function, so that in many respects the cluster can be viewed as a single computer. The nodes of a cluster are usually coupled by a network, such as the Internet or an intranet. The cluster may be managed either statically (i.e., static cluster management) or dynamically (i.e., dynamic cluster management).

A static cluster is a group of application servers that participate in some form of workload management. With a static cluster, the application servers that are in a cluster are managed statically, and once defined, all the application servers in the cluster are usually started or stopped all at once. In short, the application servers are statically assigned to a specific cluster of nodes.

In contrast, dynamic clusters are controlled by autonomic controllers (or dynamic cluster managers) that optimize the performance of the cluster. In a dynamic cluster, individual instances of application servers can be started and stopped as required. A dynamic cluster manager may also dynamically manage the workloads of the nodes of the cluster based on performance information collected from cluster nodes. Consequently, dynamic clusters optimize the use of the processing capabilities of the nodes in the clusters. When compared to a single computer or even a statically managed cluster, the dynamically managed cluster may provide increased performance by better utilizing the existing processing capabilities of the cluster.

Virtualization is another mechanism for optimizing processing at a computer. Virtualization provides a software layer that when executed allows multiple virtual machines with, in some cases, different operating systems to run side-by-side with other virtual machines running on the same physical machine (e.g., a node, computer, processor, server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced. Virtualization software may provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

SUMMARY

The subject matter disclosed herein provides methods and apparatus, including computer program products, for adapting processing in a distributed computing system based on detected changes caused by virtualization.

In one aspect, there is provided a computer-implemented method for adapting processing in a distributed computing system based on detected changes caused by virtualization. In one aspect, the computer-implemented method includes detecting whether one or more changes occur at a cluster of a distributed computing system. The one or more changes may be caused by a virtualization system. Moreover, the one or more changes may correspond to at least one of a quantity of processors at the cluster, a quantity of memory at the cluster, a quantity of bandwidth among nodes of the cluster, and a storage speed. The cluster may be adapted based on the detected changes Variations may include one or more of the following features. The increase in a quantity of physical processors at a node of the cluster may be detected. The processing at the cluster may be adjusted by increasing work processes at the cluster when the increase is detected. Detecting the increase may include initiating execution of a program to determine an execution time and initiating execution of one or more other programs to determine one or more other execution times, so that a quantity of physical processors may be determined. The increase in a quantity of memory at a node of the cluster may be detected. A change in a quantity of bandwidth from a node to a network may be detected. A change in the speed in storing information to a storage device may be detected. One or more agents may be deployed to one or more clusters to detect the one or more changes.

The subject matter described herein may be implemented to realize the advantage of providing enhanced utilization of a distributed computer system implementing virtualization technology.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
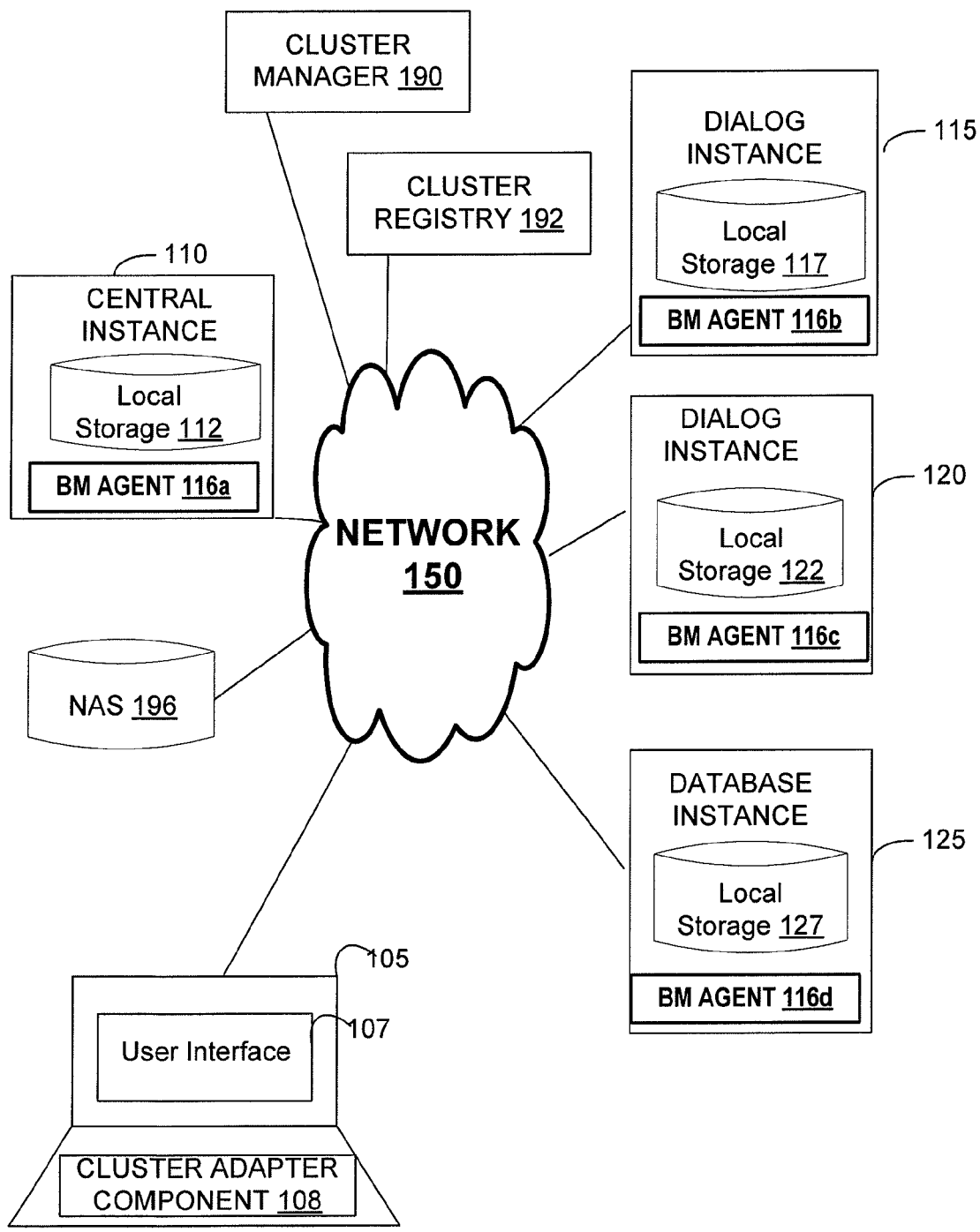
FIG. 1 depicts a block diagram of a distributed computing system.

Like labels are used to refer to same or similar items in the drawings.

DETAILED DESCRIPTION

Virtualization is a so-called "software layer" below the cluster software layer that manages the cluster of a distributed computing system. For example, virtualization software like VMWare ESX virtualizes an operating environment (including operating system, IP (Internet Protocol) addresses, registries, and other aspects normally found in a computer system) to provide a virtual machine. The virtual machine may operate on one or more nodes of one or more clusters of a distributed computing system. The virtualization software layer thus provides separate virtual machines (or containers) on which work processes may be executed. For example, the virtualization software may provide two virtual machines, one for a database instance using the Linux operating system, and another operating environment for a dialog instance serving applications (e.g., word processing, spreadsheets, user interfaces, a customer relationship management application, an enterprise resource planning application, a product lifecycle management application, a supply chain management application, a supplier relationship management application, and the like) using another operating system.

Virtualization software may move virtual machines from one node of a cluster to another node of a cluster of a distributed computing system. Virtualization software may also change the parameters of a virtual machine, such as adding more processors, adding more main memory, adding more network bandwidth and/or faster persistent storage speed. However, if cluster management software (e.g., dynamic cluster management software) fails to recognize the changes, the cluster management software cannot adapt the number of work processes at the cluster—reducing much of the benefit provided by virtualization. For example, if a cluster is moved by virtualization software from a slower to a faster node or if a virtual machine gets more virtual processors but the number of work processes inside the cluster (or node) remains the same (and this change has not been detected by the cluster or the cluster management software), the benefit provided by the change to a faster node would not be fully utilized. The full benefit, however, would be utilized if the number of work processes at the cluster were adjusted by the cluster management system. The present disclosure provides a mechanism for detecting and adjusting aspects of the cluster based on changes caused by virtualization.

FIG. 1 depicts a distributed computing system including a cluster 100 and various cluster components 110, 115, 120, and 125 coupled through network 150. As noted above, a cluster is a collection of computer nodes (e.g., computers, servers, processors, etc.) that work together. As used herein the phrase a "cluster component" refers to a part of a cluster, and that phrase is used interchangeably with "cluster node" and "node of a cluster."

The cluster system 100 also includes a cluster manager 190 for managing distributed computing system 100. In some implementations, cluster manager 190 may be incorporated into central instance 110. In some implementations, the cluster manager 190 may be incorporated into an adaptive computing management tool for managing one or more clusters (e.g., sets of clusters). An example of an adaptive computing management tool for managing a plurality of clusters (also referred to as a landscape) is the Adaptive Computing Controller available from SAP, AG.

The distributed computing system 100 also includes a cluster registry 192 for the cluster. An example of a registry is the System Landscape Directory (SLD) available from SAP, AG. The cluster registry 192 includes information describing one or more clusters. A change in processing, memory, network bandwidth, and storage speed (as described below with respect to FIG. 3 at 340, 350, 360, and 370) may be determined (e.g., detected) within the cluster itself by, for example, an agent controlled by the cluster manager; determined by an entity outside the cluster, such as by a system that manages or controls one or more clusters (e.g. adaptive computing); or determined by a combination of the noted within and outside approaches. For example, an agent (e.g., one or more programs) running within the cluster may detect changes in processing, memory, network bandwidth, and/or storage speed (as described below with respect to FIG. 3 at 340, 350, 360, and 370) by polling (e.g., sending a message to) an operating system and receiving a response representative of any changes. Similarly, an agent running outside the cluster may also poll or send a message to an operating system to detect such changes; while in other instances, the operating system may provide such information to an agent whenever a change in processing, memory, network bandwidth, and/or storage speed (as described below with respect to FIG. 3 at 340, 350, 360, and 370) occurs.

The distributed computing system 100 also includes a computer 105 including a user interface 107 for interacting with a cluster adaptation component 108. The cluster adaptation component 108 adapts the cluster based on changes caused by virtualization. The cluster adaptation component 108 may be implemented as a program, group of programs, and/or small binary object (e.g., an applet) that performs one or more functions associated with adapting the cluster, as described further below. Although cluster adaptation component 108 and cluster manager 190 are depicted as separate from the central instance 110, in some implementations both may be implemented anywhere (e.g., in central instance 110) and in multiple locations as well.

The cluster adaptation component 108 may also perform one or more of the following functions: detecting whether changes occur at a cluster or a cluster node of a distributed computing system; detecting changes caused by virtualization including a change in the quantity of physical processors at the cluster or cluster node, a change in memory at the cluster or cluster node, a change in bandwidth from a cluster or cluster node to a network, and a change in speed when storing to a storage device; adapting the cluster or cluster node based on any detected changes; and deploying agents (e.g., benchmark (BM) agents 116a-d) to one or more cluster nodes to detect changes caused by virtualization. In some implementations, cluster adaptation component 108 may be implemented as a program (e.g. an ABAP program or a J2EE program running inside of the cluster that constantly runs a benchmark to detect the processor speed as well as other changes). In some implementations, a part (e.g., as an agent) of the cluster adaptation component 108 is outside of the cluster to determine main memory changes as well as other changes, which are reported back to the agent within the cluster.

Benchmark (BM) agents 116*a-d* may be deployed (e.g., sent and/or installed) by adaptation component 108 to cluster nodes 110, 115, 120, and 125. Although agents 116*a-d* are depicted within cluster system 100, agents 116*a-d* may be located outside the cluster, inside the cluster, or a combination of outside and inside. Benchmark agents 116*a-d* may be implemented as a program, group of programs, and/or small binary object (e.g., an applet) that performs one or more functions associated with detecting any changes at a cluster or node and reporting any detected changes to cluster adaptation component 108 and/or cluster manager 190. Benchmark agents 116*a-d* may perform one or more of the following functions: detecting the quantity of physical processors; initiating execution of benchmark programs at clusters and/or nodes; measuring execution time of benchmark programs; determining the amount of local memory at a node or cluster; determining changes in network bandwidth by copying a file from one node to another node; and determining changes in storage speed by writing or reading a file to a persistent storage device and measuring the write time or the read time.

The cluster 100 includes a central instance configured on that cluster. The central instance is an application server that controls the computational processes among the nodes of a cluster and may include a message server for communications. The central instance may also have an associated system identifier (SID) to identify the cluster to the cluster manager 190 and cluster registry 192.

The dialog instances are also application servers configured on respective clusters 115 and 120. For example, the dialog instance may be an application server providing applications, such as word processing, spreadsheets, databases, a customer relationship management application, an enterprise resource planning application, a product lifecycle management application, a supply chain management application, a supplier relationship management application, and the like. When a client computer accesses a word processing application at cluster 115, the word processing application runs on that cluster. If another client computer accesses cluster 115, another word processing application is served on that cluster.

System 100 also depicts an instance of a database application server on a cluster node 125. System 100 may also include a network-attached storage (NAS) 196 coupled to network 150 and accessible to cluster nodes 110-125, cluster manager 190, and cluster registry 192. The network-attached server (Labeled "NAS") 196 may provide persistent storage for cluster nodes 110-125. The cluster nodes 110-125 may also include local storage 112, 117, 122, and 127 for locally providing persistent storage. In some implementation, each cluster node 110-125 represents a different physical machine, such as a physical computer or physical processor.

Figure 2:
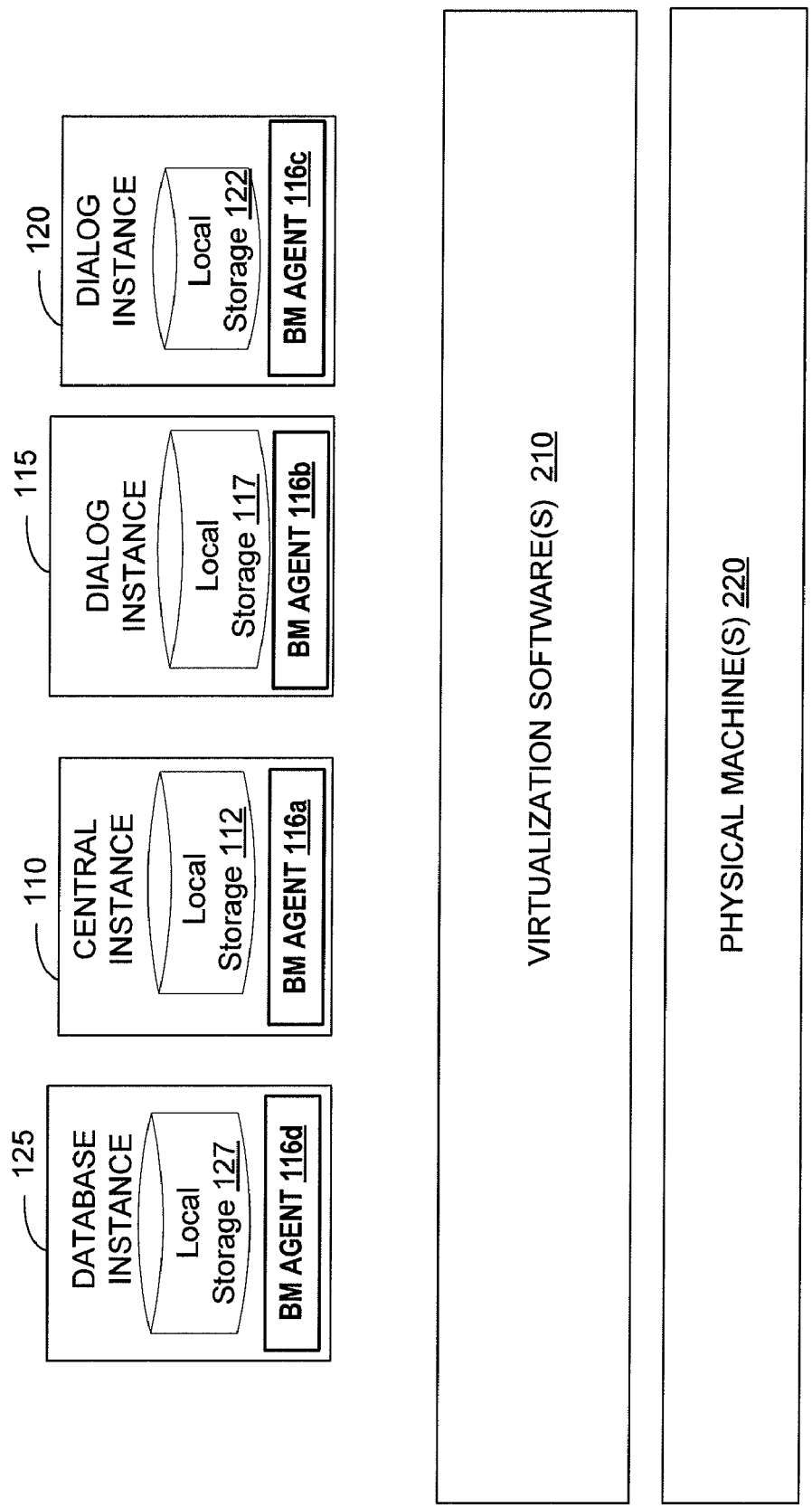
FIG. 2 depicts a block diagram of virtualization software used in a distributed computing system.

FIG. 2 depicts cluster system 100 with an underlying virtualization software layer 210. The virtualization software 210 interacts with the physical machine(s) 220 (e.g., basic input/output system (BIOS), operating systems, etc.) to provide the virtualization depicted in FIG. 2. The cluster nodes 110-125 may each include an instance operating in a separate virtual machine. The one or more virtual machines are provided by the virtualization layer software 210. The virtualization software 210 provides independent, virtual machines to the nodes of the clusters. The virtualization software 210 also provides to each virtual machine IP addresses, memory, registries, operating system, local storage, and the like. The virtualization software 210 thus interacts with the physical machine (e.g., a node) hosting the virtual machines.

Although FIG. 2 depicts single instances (e.g., instances 110-125) of an application running on a single virtual machine, any number of instances (e.g., application servers, dialog instances, and the like) may also run on a single virtual machine.

Figure 3:
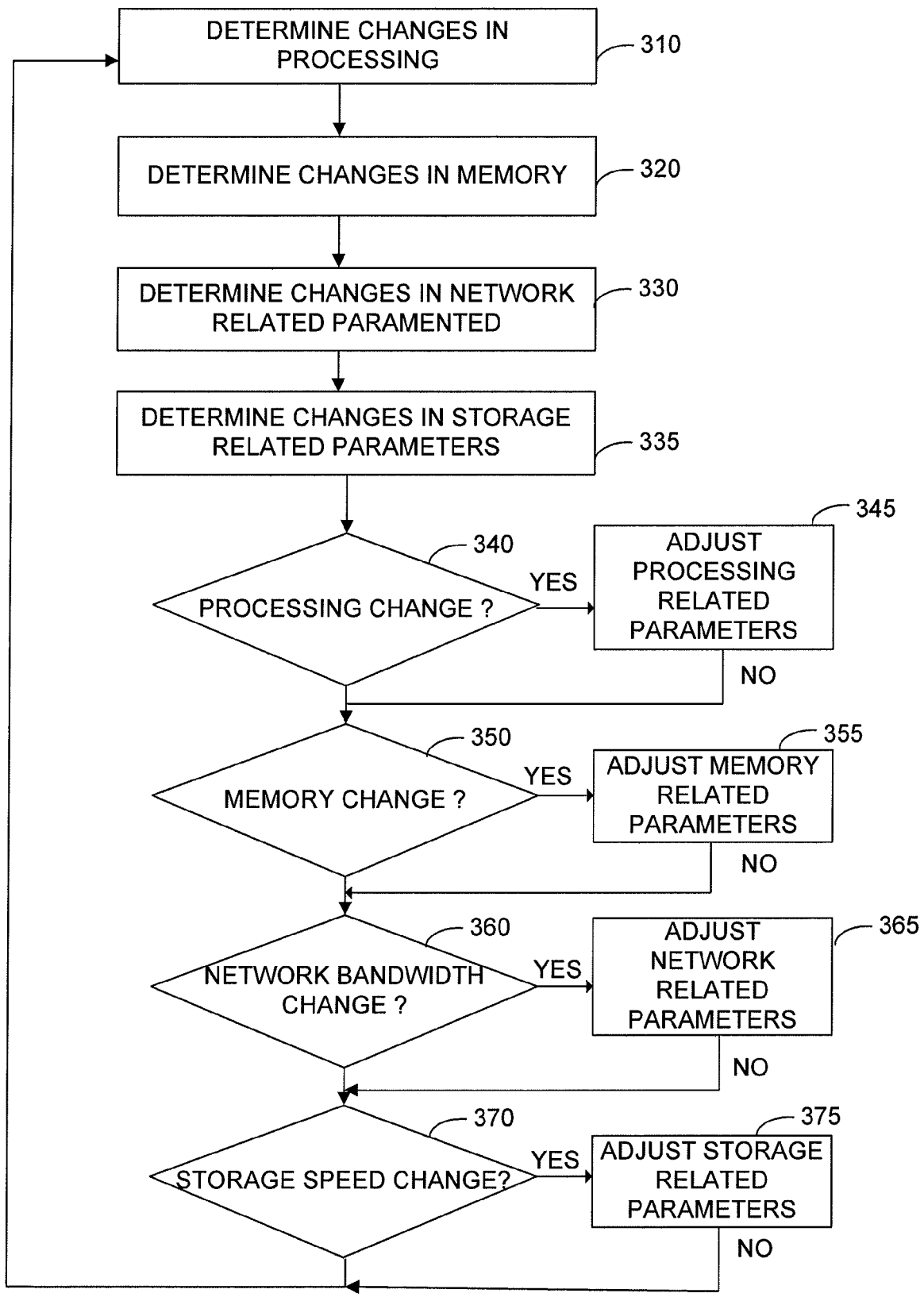
FIG. 3 depicts a process of detecting changes at a node caused by virtualization software and adapting aspects of the distributed computing system based on the changes.

FIG. 3 depicts a process for detecting changes caused by virtualization to enable the cluster manager 190 to adapt the clusters to the detected changes. At 310, changes in processing are detected. In some implementations, benchmark agents 116*a-d* may be used to detect changes in processing capabilities inside each of the clusters. To detect changes in processing capabilities, the benchmark agents 116*a-d* may periodically measure, monitor, and/or detect any changes in processing at each cluster and its nodes. Any changes detected by the benchmark agents 116*a-d* may be sent to cluster adapter component 108 and/or cluster manager 190. To adapt to any detected changes, aspects of a cluster may be adjusted by increasing or decreasing the number of work processes at a node or cluster. In one implementation, the work processes at a cluster represent the units that are responsible for executing all tasks inside of the cluster, such as queries of a database instance; saves to a database instance; all types of calculations (e.g. CRM, SCM, and ERP type of calculations), network communications, and the like. In some implementations, work processes in a cluster are similar to processes in an operating system.

One challenge in detecting the number of processors running in a cluster is that some technologies (e.g., hyper threading technology) make it difficult to determine the true number of real, physical processors (e.g., microprocessors) at a node or cluster. For example, if hyper threading technology is used and there are only two real, physical processors available, the operating system may treat these two processors like four processors. In one implementation, determining the quantity of real, physical processor at a node or cluster is performed using the following process. Benchmark agent 116*d* initiates two benchmark programs to run at the same time. The benchmark programs may be any type of program, such as a program that computes all prime numbers between 1 and 1000. If the execution time of the benchmark programs is the same as the execution time of a single run of the benchmark program, then at least two real, physical processors are present. Next, the number of benchmark programs initiated and run in parallel is repeatedly increased by one until the overall execution time of the benchmark programs exceeds the execution time of a single run of the benchmark program. Returning to the previous example, given three benchmark programs initiated and run in parallel (i.e., at the same time), if running the three benchmark programs in parallel exceeds the execution time of a single run of the benchmark program, then the number of real, physical processors is equal to the number of benchmark programs running in parallel minus one. For example, if the execution time of a single benchmark program is 50 milliseconds, the execution time of two benchmark programs running in parallel is also 50 millisecond, the execution time of three benchmark programs running in parallel is also 50 millisecond, and the execution time of four benchmark programs running in parallel is 100 millisecond (exceeding the 50 millisecond execution time of a single, benchmark program), then the number of real physical processor is three (i.e., 4 benchmark programs minus 1).

In some implementations, not only is the cluster manager 190 aware of changes and thus able to adapt to those changes (e.g., 310-335 at FIG. 3), in come cases the cluster manager 190 may prevent changes from taking place in the system. Moreover, cluster manager 190 may include an interface to enable or disable adaptation to changes. For example, given one cluster running on a virtual machine and the virtual machine is changed (e.g., increased by two more physical processors and twice the amount of physical main memory), the cluster manager 190 may be disabled (e.g., by a user or another process) so as to not adapt to these changes reported by a bench mark agent.

At 320, changes in memory are determined. In some implementations, a benchmark agent monitors memory by calling a function to provide the total amount of main memory. For example, benchmark agent 116*d* may call an operating system function or utility at a node, so that the called function or utility provides the total amount of main memory at the node. One example of such a utility is the PsInf, a Windows NT and Windows 2000 utility. PsInf is a command-line call that determines the amount of physical memory at a computer. PsInf may also be used to determine number of processors at 310 above.

At 330, changes in network related parameters (e.g., bandwidth) are detected. In some implementations, a benchmark agent detects changes in network bandwidth by periodically copying a file between nodes and/or clusters. For example, a file of known size may be copied from one node to another node across network 150. An increase or decrease in available bandwidth would result in a corresponding decrease or increase in the time it takes to copy the file between nodes.

At 330, changes in storage related parameters (e.g., persistent storage speed) at a node or cluster are detected. In some implementations, a benchmark agent detects changes in persistent storage speed at a node or a cluster by writing a file to a database or a file system and reading it from the database or file system. For example, a file of known size may be written to and/or read from a database system or file system at the node or cluster. An increase in the time it takes to write and/or read the file to persistent storage represents a decrease in persistent storage speed. Likewise, a decrease in the time it takes to write and/or read the file to persistent storage represents an increase in persistent storage speed. The persistent storage may be implemented as local storage (e.g., a local disk drive, such as local storage 112, 117, 122, and 127) or as a network-attached storage 196.

At 340-345, when a change in processing is detected at 310, the number of work processes at a node or a cluster may be adapted (e.g., increased or decreased) depending on the detected change. For example, benchmark agent 116*d* may detect that 2 physical processors have been added to cluster 125. When that is the case, benchmark agent 116*d* may send a message to cluster adapter component 108, and cluster adapter component 108 may send a corresponding message to cluster manager 190 to increase the number of work processes at cluster 125. In some cases, cluster manager 190 may increase the number of work processes at cluster 125 automatically. Alternatively, cluster manager 190 may prompt a user of user interface 107 whether such an increase of processes at cluster 125 is allowed. If the user at user interface 107 accepts the increase by indicating that at user interface 107, cluster manager 190 increases the number of processes (e.g., cluster 125 may be allowed to processes more credit card transactions).

On the other hand, when benchmark agent 116*d* detects that two processors have been removed from cluster 125, benchmark agent 116*d* may send a message to cluster adapter component 108, and cluster adapter component 108 may send a corresponding message to cluster manager 190 to decrease the number of processes at cluster 116*d*. Cluster manager 190 may automatically decrease the number of processes at cluster 125, or, alternatively, prompt a user of user interface 107 whether such a decrease at cluster 125 is allowed. If the user at user interface 107 accepts the decrease, cluster manager 190 decreases the number of processes.

At 350-355, when a change in a memory related parameter (e.g., available main memory) is determined at 320, a benchmark agent indicates to cluster adapter 108 and/or cluster manager 190 that memory related operations might be adapted (e.g., increased or decreased). Examples of memory related operation that may be adapted are an increase or a decrease in queue length, an increase or decrease in cache size, increase or decrease of object pools, increase or decrease of in-memory objects such as collections, increase or decrease of the maximum number of parallel iterations (e.g., in an Advanced Planner and Optimizer (APO)), or any other change that may be made to take advantage of a change in memory. For example, benchmark agent 116*d* may detect that available memory at a node of cluster 125 has doubled. When that is the case, benchmark agent 116*d* may send a message to cluster adapter component 108, and cluster adapter component 108 may send a corresponding message to cluster manager 190 to decrease the cache size at that node of cluster 125. Cluster manager 190 may automatically decrease cache size at cluster 125, or, alternatively, prompt a user of user interface 107 whether such a decrease at cluster 125 is allowed. If the user at user interface 107 accepts the decrease, cluster manager 190 decreases cache size at the node of cluster 125.

At 360-365, when a change in a network related parameter (e.g., bandwidth or speed) is determined at 330, a benchmark agent indicates to cluster adapter 108 and/or cluster manager 190 that network related operations may be adapted (e.g., increased or decreased). Examples of network related operations that may be adapted include one or more of the following: the number of SQL handlers, packet sizes, maximum size of a single object, decrease of cache sizes to save main memory, or any other change that may be made to take advantage of a change in a network related parameter. For example, benchmark agent 116*d* may detect that network bandwidth from a node to network 150 has doubled. When that is the case, benchmark agent 116*d* may send a message to cluster adapter component 108, which sends a message to cluster manager 190 to decrease the number of SQL handlers at that node of cluster 125. Cluster manager 190 may automatically increase the number of SQL handlers, or, alternatively, prompt a user of user interface 107 whether the decrease of SQL handlers at cluster 125 is allowed. If the user at user interface 107 accepts the decrease, cluster manager 190 decreases the number of SQL handlers at the node of cluster 125.

At 370-375, when a change in a storage related parameter (e.g., read/write speed to persistent storage) is detected at 335, a benchmark agent indicates to cluster adapter 108 and/or cluster manager 190 that persistent storage related operations might be adapted. Examples of persistent storage related operations that may be adapted include one or more of the following: adjusting the number of connection handlers; adjusting the length of block operations, adjusting the cache sizes, or any other change that may be made to take advantage of a change in storage speed. For example, benchmark agent 116*d* may detect that the speed of writing and/or reading a file of known size to persistent storage at a node of cluster is slower. When that is the case, benchmark agent 116*d* may send a message to cluster adapter component 108, which may then send a corresponding message to cluster manager 190 to increase the number of connection handlers to persistent storage. Cluster manager 190 may automatically decrease the number of connection handlers to persistent storage, or, alternatively, prompt a user of user interface 107 whether such a decrease at cluster 125 is allowed. If the user at user interface 107 accepts the increase, cluster manager 190 decreases the number of connection handlers to persistent storage.

In some implementations, the adjustments of 345, 355, 365, and 375 are performed automatically, while in other implementations, a user is prompted before any changes are made. In some cases, a user may be notified by email regarding whether a change may be initiated.

Referring again to FIG. 1, the cluster manager 190 enables the addition and removal of computing resources with minimal administrative effort. The cluster manager 190 may also manage workloads and assign instances of applications to a computing resource, such as one or more nodes. The cluster manager 190 may also build connections between computing and storage resources, provide a transport layer for virtualization, and support different network topologies, such as TCP/IP, iSCSI, and Fibre Channel.

User interface 107 may be implemented as any interface that enables a user to interact with an application or program, such as cluster adapter component 108, through network 150. The user interface 107 may be implemented as a browser, such as Netscape Navigator or the like, or any other type of graphical user interface. In some implementations, SAP Web Dynpro (commercially available from SAP AG, Walldorf, Germany) may be used as a model-based development environment for generating user interface 107, although other development environments may be used.

Network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide network 150. Moreover, network 150 may be embodied using bi-directional, unidirectional, or dedicated networks. Communications through network 150 may also operate with standard transmission protocols, such as Transmission Control Protocol/Internet Protocol (TCP/IP), Hyper Text Transfer Protocol (HTTP), SOAP, RPC, or other protocols.

Although cluster adapter component 108 is depicted at computer 105, cluster adapter component 108 may be located anywhere and in multiple locations. Moreover, Although agents 116a-d are depicted in FIGS. 1 and 2 within a corresponding instance, agents 116a-d may be located anywhere and distributed in multiple locations.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-implemented method comprising:
monitoring, by a cluster agent, a node of a cluster of nodes of a distributed computing system that work together to perform a function, the node comprising a virtual machine provided by a virtualization software layer of the distributed computing system and comprising resources of one or more physical processors of the distributed computing system;
detecting, by the cluster agent, a parameter change to the virtual machine caused by an action of the virtualization software layer, the parameter change comprising increasing or decreasing a quantity of the one or more physical processors at the cluster while a number of work processes within the cluster remains constant, the detecting comprising comparing results of successive instances of a benchmarking routine, the benchmarking routine comprising determining the quantity of physical processors at the cluster as equal to a maximum number of runs of a single-processor benchmark program that the cluster is capable of executing in parallel without an increase in an execution time to complete the runs; and
adapting the cluster based on the detected parameter change.

2. The computer-implemented method of claim 1, wherein the parameter change comprises: an increase in a quantity of the one or more physical processors whose resources the node comprises.

3. The computer-implemented method of claim 2, wherein the adapting further comprises: adjusting processing at the node by increasing work processes at the node when the increase is detected by the cluster agent.

4. The computer-implemented method of claim 1, wherein the parameter change further comprises an increase or a decrease in the processing speed of the node.

5. The computer-implemented method of claim 1, further comprising: implementing the distributed computing system to include one or more clusters that comprise the cluster, the one or more clusters each including one or more nodes, the one or more nodes including at least one central instance for managing at least one of the one or more clusters.

6. The computer-implemented method of claim 1, wherein the parameter change further comprises: detecting a change in a quantity of bandwidth from the node to a network coupled to the node.

7. The computer-implemented method of claim 1, wherein the parameter change comprises: an increase or a decrease in the storage speed with which the node stores data to the storage device, the storage device being coupled to the cluster, the parameter change being detected by writing or reading a file to the storage device and measuring a write or a read time.

8. The computer-implemented method of claim 1, further comprising: deploying the cluster agent to the cluster.

9. A non-transitory computer-readable medium containing instructions to configure a processor to perform a method, the method comprising:

monitoring, by a cluster agent, a node of a cluster of nodes of a distributed computing system that work together to perform a function, the node comprising a virtual machine provided by a virtualization software layer of the distributed computing system and comprising resources of one or more physical processors of the distributed computing system;

detecting, by the cluster agent, a parameter change to the virtual machine caused by an action of the virtualization software layer, the parameter change comprising increasing or decreasing a quantity of the one or more physical processors at the cluster while a number of work processes within the cluster remains constant, the detecting comprising comparing results of successive instances of a benchmarking routine, the benchmarking routine comprising determining the quantity of physical processors at the cluster as equal to a maximum number of runs of a single-processor benchmark program that the cluster is capable of executing in parallel without an increase in an execution time to complete the runs; and adapting the cluster based on the detected parameter change.

10. The non-transitory computer-readable medium of claim 9, wherein the parameter change comprises: an increase in a quantity of the one or more physical processors whose resources the node comprises.

11. The non-transitory computer-readable medium of claim 10, wherein the adapting further comprises: adjusting processing at the node by increasing work processes at the node when the increase is detected by the cluster agent.

12. The non-transitory computer-readable medium of claim 9, wherein the parameter change further comprises an increase or a decrease in the processing speed of the node.

13. The non-transitory computer-readable medium of claim 9, further comprising: implementing the distributed computing system to include one or more clusters that comprise the cluster, the one or more clusters each including one or more nodes, the one or more nodes including at least one central instance for managing at least one of the one or more clusters.

14. The non-transitory computer-readable medium of claim 9, wherein the parameter change further comprises: detecting a change in a quantity of bandwidth from a node to a network coupled to a node of the cluster of the distributed computing system.

15. The non-transitory computer-readable medium of claim 9, wherein the parameter change further comprises: an increase or a decrease in the storage speed with which the node stores data to the storage device, the storage device being coupled to the cluster, the parameter change being detected by writing or reading a file to the storage device and measuring a write or a read time.

16. The non-transitory computer-readable medium of claim 9, further comprising: deploying the cluster agent to the cluster.

17. A system comprising:

a processor; and a memory, wherein the processor and the memory are configured to perform a method comprising:

monitoring, by a cluster agent, a node of a cluster of nodes of a distributed computing system that work together to perform a function, the node comprising a virtual machine provided by a virtualization software layer of the distributed computing system and comprising resources of one or more physical processors of the distributed computing system;

detecting, by the cluster agent, a parameter change to the virtual machine caused by an action of the virtualization software layer, the parameter change comprising increasing or decreasing a quantity of the one or more physical processors at the cluster while a number of work processes within the cluster remains constant, the detecting comprising comparing results of successive instances of a benchmarking routine, the benchmarking routine comprising determining the quantity of physical processors at the cluster as equal to a maximum number of runs of a single-processor benchmark program that the cluster is capable of executing in parallel without an increase in an execution time to complete the runs; and adapting the cluster based on the detected parameter change.

18. The system of claim 17, wherein the parameter change comprises: an increase in a quantity of the one or more physical processors whose resources the node comprises.

19. The system of claim 18, wherein the adapting further comprises: adjusting processing at the node by increasing work processes at the node when the increase is detected by the cluster agent.

20. The system of claim 17, wherein the parameter change further comprises an increase or a decrease in the processing speed of the node.

* * * * *